US012789642B2

(12) United States Patent
Luo et al.

(10) Patent No.: US 12,789,642 B2
(45) Date of Patent: Nov. 10, 2026

(54) TWO-IN-ONE GEAR AND BEARING CURRENT SENSING AND REDUCTION VIA CURRENT CHOKE

(71) Applicant: GM Global Technology Operations LLC, Detroit, MI (US)

(72) Inventors: Yilun Luo, Ann Arbor, MI (US); Minh-Khai Nguyen, Troy, MI (US); Renato Amorim Torres, Pontiac, MI (US); Alireza Fatemi, Canton, MI (US); Thomas K. Duhon, Ortonville, MI (US); Azadeh Narimissa, Lake Orion, MI (US); Shaoyan Richard Ye, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 18/440,194

(22) Filed: Feb. 13, 2024

(65) Prior Publication Data

US 2025/0256587 A1 Aug. 14, 2025

(51) Int. Cl.

*B60L 15/20* (2006.01)
*H02P 21/22* (2016.01)
*H02P 27/08* (2006.01)

(52) U.S. Cl.

CPC .......... *B60L 15/2009* (2013.01); *H02P 21/22* (2016.02); *H02P 27/08* (2013.01); *B60L 2240/423* (2013.01); *B60L 2240/429* (2013.01)

(58) Field of Classification Search

CPC ........... B60L 15/2009; B60L 2240/423; B60L 2240/429; H02P 21/22; H02P 27/08

See application file for complete search history.

(56) References Cited

U.S. PATENT DOCUMENTS 3,934,183 A * 1/1976 Saufferer ............... H02K 41/03 104/243
6,998,740 B2 * 2/2006 Matsuki ................. H02K 11/33 310/68 D (Continued)

FOREIGN PATENT DOCUMENTS

DE 102005012656 A1 6/2006
DE 102007027727 A1 1/2008
FR 2944164 A1 10/2010

OTHER PUBLICATIONS

German Application No. 10 2024 109 087.1 filed Mar. 28, 2024; German Office Action dated Jan. 24, 2025; 5 pages.

*Primary Examiner* — Gonzalo Laguarda

(74) *Attorney, Agent, or Firm* — CANTOR COLBURN LLP

(57) ABSTRACT

A vehicle, system and method of operating the vehicle. The system includes a motor, a choke and a processor. The motor includes a rotor shaft and a bearing between the rotor shaft and the motor, wherein a bearing current flows through the bearing and along the rotor shaft between the motor and a gearbox of the vehicle and wherein the motor is run at a selected motor speed and selected motor torque. The choke is disposed at the rotor shaft between the motor and the gearbox. The choke includes a winding, wherein the bearing current passes through the choke to induce a sensing current through the winding. The processor is configured to determine the bearing current from the sensing current and transmit a signal to notify a user when the bearing current is greater than a selected damage threshold.

20 Claims, 11 Drawing Sheets

(56) References Cited

U.S. PATENT DOCUMENTS

| | | | | |
|---|---|---|---|---|
| 8,593,150 | B2 * | 11/2013 | Vrankovic ............. | G01R 31/52<br>324/509 |
| 12,348,106 | B2 | 7/2025 | Ivan et al. | |
| 12,500,484 | B2 * | 12/2025 | Alvi ..................... | H02K 11/028 |

* cited by examiner

TWO-IN-ONE GEAR AND BEARING CURRENT SENSING AND REDUCTION VIA CURRENT CHOKE

INTRODUCTION

The subject disclosure relates to diagnosing internal motor currents and, in particular, to a system and method of detecting damage to bearings of a motor based on a bearing current of the motor.

An electric motor is used to operate an electric vehicle. When operated with a given range of motor torque or motor speed, internal currents can be induced in the motor which can cause damage. In, particular a current can flow through a bearing that allows a rotor shaft to rotate with respect to a frame of the motor. This bearing current can cause damage to the bearing over time, thereby inhibiting operation of the motor. Accordingly, it is desirable to provide a method for diagnosing a damage to a bearing of the motor due to bearing current.

SUMMARY

In one exemplary embodiment, a method of operating a vehicle is disclosed. A motor of the vehicle is run at a selected motor speed and a selected motor torque to generate a bearing current that flows through a bearing of the motor and along a rotor shaft between the motor and a gearbox of the vehicle. A sensing current is measured, the sensing current being induced through a winding at a choke in response to flow of the bearing current through the choke. The bearing current is determined from the sensing current. A signal is transmitted to notify a user when the bearing current is greater than a selected damage threshold.

In addition to one or more of the features described herein, measuring the sensing current further includes measuring the sensing current via an ammeter coupled to the winding.

In addition to one or more of the features described herein, measuring the sensing current further includes measuring a voltage across a resistor that connects ends of the winding and determining the sensing current from the voltage and a resistance of the resistor.

In addition to one or more of the features described herein. measuring the sensing current further comprises measuring a voltage across ends of the winding and integrating the voltage over a time duration to determine the sensing current.

In addition to one or more of the features described herein, the choke is disposed at the rotor shaft between the motor and the gearbox.

In addition to one or more of the features described herein, the method further includes measuring an inverter common mode current at an inverter and determining a common mode current at the motor based on the inverter common mode current, wherein the inverter common mode current is measured via one of an inverter choke through which a positive DC power line of the inverter and a negative DC power line of the inverter passes and an inverter choke through which at least one of an AC output line of the inverter passes.

In addition to one or more of the features described herein, the method further includes at least one of changing an oil of a drive unit in response to the signal and replacing the bearing in response to the signal.

In another exemplary embodiment, a system for operating a vehicle is disclosed. The system includes a motor, a choke and a processor. The motor includes a rotor shaft and a bearing between the rotor shaft and the motor, wherein a bearing current flows through the bearing and along the rotor shaft between the motor and a gearbox of the vehicle and wherein the motor is run at a selected motor speed and selected motor torque. The choke includes a winding, wherein the bearing current passes through the choke to induce a sensing current through the winding. The processor is configured to determine the bearing current from the sensing current and transmit a signal to notify a user when the bearing current is greater than a selected damage threshold.

In addition to one or more of the features described herein, the system further includes an ammeter coupled to the winding to measure the sensing current.

In addition to one or more of the features described herein, the system further includes a resistor that connects ends of the winding and a voltmeter for measuring a voltage induced across the resistor by the sensing current, wherein the processor determines the sensing current from the voltage and a resistance of the resistor.

In addition to one or more of the features described herein, the system further includes a voltmeter across ends of the winding for measuring a voltage and an integrating circuit configured to integrate the voltage over a time duration to determine the sensing current.

In addition to one or more of the features described herein, wherein the choke is disposed at the rotor shaft between the motor and the gearbox.

In addition to one or more of the features described herein, the system further includes one of an inverter choke through which a positive DC power line of an inverter and a negative DC power line of the inverter passes and an inverter choke through which at least one of an AC output line of the inverter passes, wherein the processor is configured to measure an inverter common mode current at the inverter choke and determine a common mode current at the motor based on the inverter common mode current.

In addition to one or more of the features described herein, the system further includes at least one of changing an oil of a drive unit in response to the signal and replacing the bearing in response to the signal.

In another exemplary embodiment, a vehicle is disclosed. The vehicle includes a motor, a choke and a processor. The motor includes a rotor shaft and a bearing between the rotor shaft and the motor, wherein a bearing current flows through the bearing and along the rotor shaft between the motor and a gearbox of the vehicle and wherein the motor is run at a selected motor speed and selected motor torque. The choke includes a winding, wherein the bearing current passes through the choke to induce a sensing current through the winding. The processor is configured to determine the bearing current from the sensing current and transmit a signal to notify a user when the bearing current is greater than a selected damage threshold.

In addition to one or more of the features described herein, the vehicle further includes an ammeter coupled to the winding to measure the sensing current.

In addition to one or more of the features described herein, the vehicle further includes a resistor that connects ends of the winding and a voltmeter for measuring a voltage induced across the resistor by the sensing current, wherein the processor determines the sensing current from the voltage and a resistance of the resistor.

In addition to one or more of the features described herein, the vehicle further includes a voltmeter across ends of the winding for measuring a voltage and an integrating circuit configured to integrate the voltage over a time duration to determine the sensing current.

In addition to one or more of the features described herein, the choke is disposed at the rotor shaft between the motor and the gearbox.

In addition to one or more of the features described herein, the vehicle further includes one of an inverter choke through which a positive DC power line of an inverter and a negative DC power line of the inverter passes and an inverter choke through which at least one of an AC output line of the inverter passes, wherein the processor is configured to measure an inverter common mode current at the inverter choke and determines a common mode current at the motor based on the inverter common mode current.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
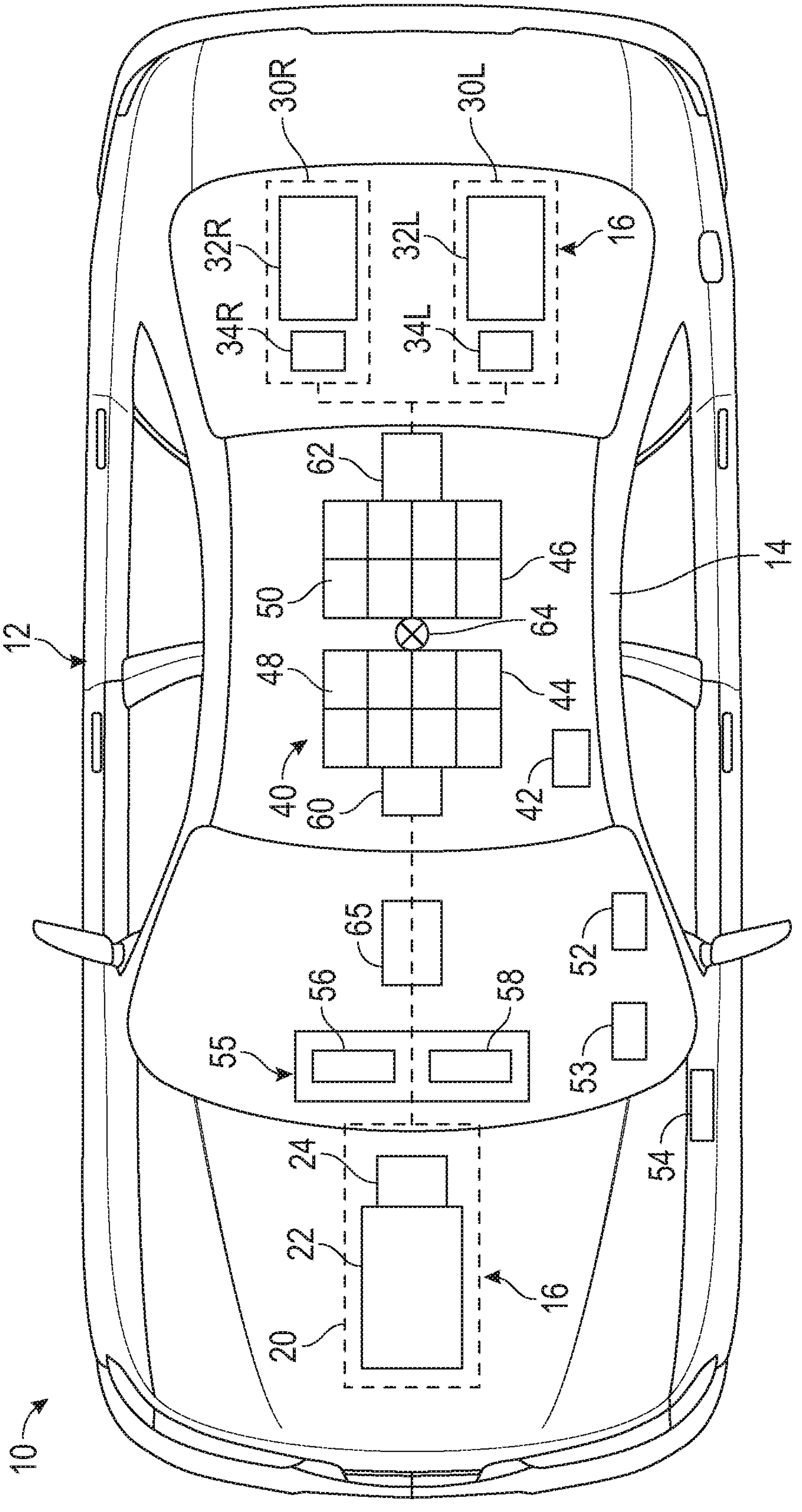
FIG. 1 shows a vehicle in accordance with an illustrative embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an embodiment of a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes a left rear electric motor 32L and a left rear inverter 34L. A right rear drive unit 30R includes a right rear electric motor 32R and a right rear inverter 34R. The front inverter 24, left rear inverter 34L and right rear inverter 34R (e.g., power inverter units or PIMs) each convert direct current (DC) power from a high voltage (HV) battery system 40 to poly-phase (e.g., two-phase, three-phase, six-phase, etc.) alternating current (AC) power to drive the front electric motor 22 the left rear electric motor 32L and the right rear electric motor 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives the front wheels (not shown), and the left rear electric motor 32L and right rear electric motor 32R drive the rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the front drive unit 20, left rear drive unit 30L and right rear drive unit 30R are electrically connected to a battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the front inverter 24, and a second battery pack 46. The first battery pack 44 includes a plurality of battery modules 48, and the second battery pack 46 includes a plurality of battery modules 50. Each of the first plurality of battery modules 48 and the second plurality of battery modules 50 includes a number of individual cells (not shown). In various embodiments, one or more of the battery packs can include a MODACS (Multiple Output Dynamically Adjustable Capacity) battery.

Each of the front electric motor 22 and the left rear electric motor 32L and right rear electric motor 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the first battery pack 44 and second battery pack 46, and selectively connecting the first battery pack 44 and second battery pack 46 to the front drive unit 20, left rear drive unit 30L and right rear drive unit 30R. The switching devices may also be operated to selectively connect the first battery pack 44 and the second battery pack 46 to a charging system. The charging system can be used to charge the first battery pack 44 and the second battery pack 46, and/or to supply power from the first battery pack 44 and/or the second battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects to the first battery pack 44 to the front inverter 24, left rear inverter 34L and right rear inverter 34R, and a second switching device 62 that selectively connects the second battery pack 46 to the front inverter 24, left rear inverter 34L and right rear inverter 34R. The switching system also includes a third switching device 64 (also referred to as a "battery switching device") for selectively connecting the first battery pack 44 to the second battery pack 46 in series.

Any of various controllers can be used to control functions of the battery system 40, the switching system and the drive units. A controller includes any suitable processing device or unit and may use an existing controller such as a drive system controller, an RESS controller, and/or controllers in the drive system. For example, a controller 65 may be included for controlling switching and drive control operations as discussed herein.

The controller may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller may include a non-transitory computer-readable medium that stores instructions which, when processed by one or more processors of the controller, implement a method of determining a voltage to be applied at an inverter of the electric vehicle, according to one or more embodiments detailed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

As illustrated herein, the vehicle 10 is an electric vehicle. In an alternative embodiment, the vehicle 10 can be an internal combustion engine vehicle, a hybrid vehicle, etc.

Figure 2:
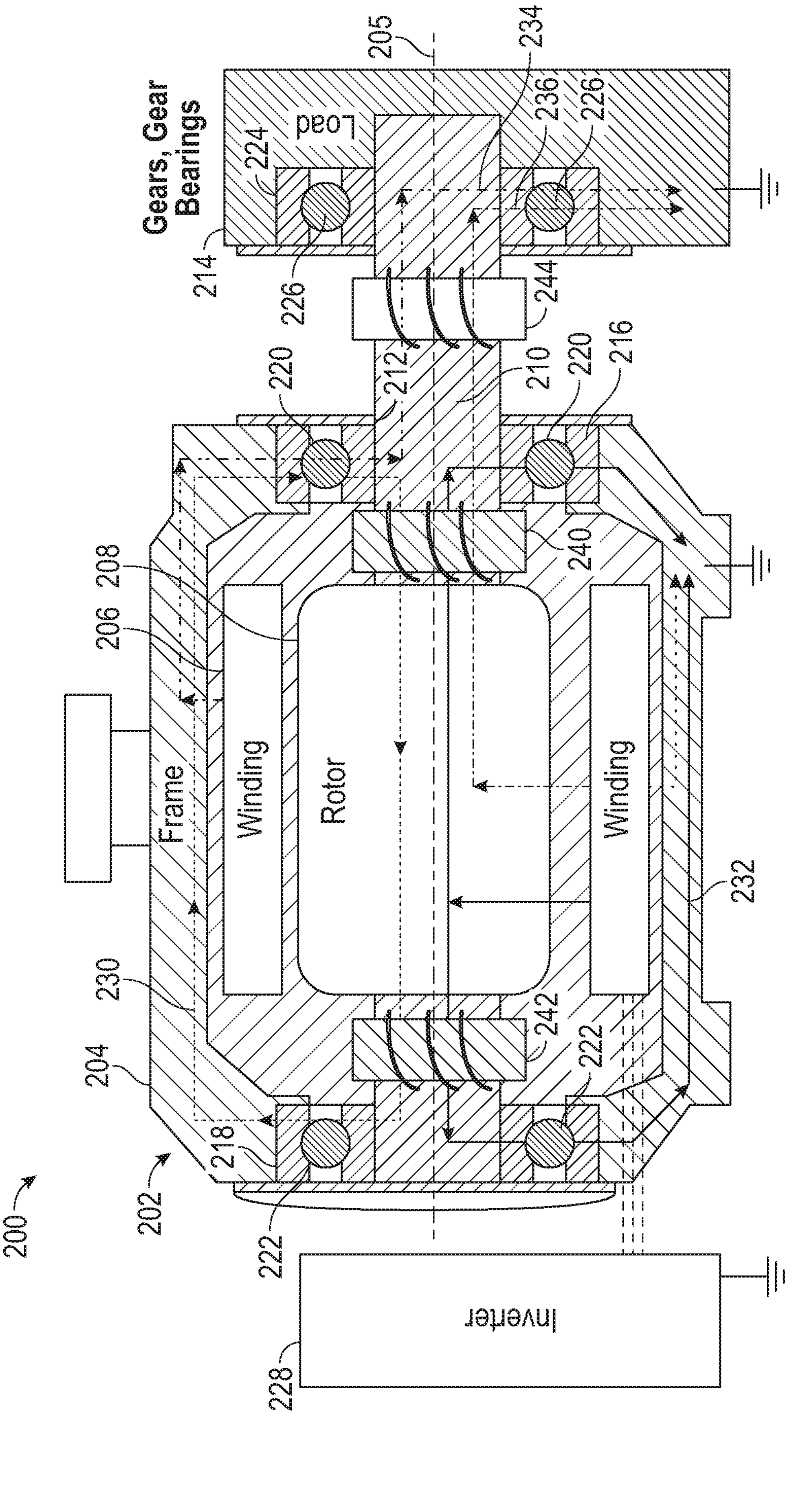
FIG. 2 show a side cross-sectional view of a motor of the vehicle, in an embodiment.

FIG. 2 show a side cross-sectional view 200 of a motor 202 of the vehicle, in an embodiment. The motor 202 includes a frame 204 that forms an enclosed space including a stator 206 and a rotor 208 therein. The rotor 208 rotates about a longitudinal axis 205 of the motor 202 with respect to the stator 206 and is connected to a rotor shaft 210. The rotor shaft 210 passes out of the motor 202 through an aperture 212 in the frame 204 and into a gearbox 214, thereby transferring torque from the motor to the gear box.

The motor 202 further includes one or more bearing housings for reducing friction between the rotor shaft 210 and the frame 204 during rotation of the rotor 208. A first bearing housing 216 is disposed between the rotor shaft 210 and the frame 204 on a first side of the rotor 208 near the aperture 212. A second bearing housing 218 is disposed between the rotor shaft 210 and the frame 204 at a second side of the rotor 208 opposite the first side. The first bearing housing 216 includes a first set of bearings 220 that reduce friction between the rotor shaft and the frame at the first side and the second bearing housing 218 includes a second set of bearings 222 that reduce friction between the rotor shaft and the frame at the second side. The gearbox 214 can include a third bearing housing 224 having a third set of bearings 226 for reducing friction between the rotor shaft 210 and a frame of the gearbox.

An inverter 228 provides a three-phase current to the motor 202 to produce rotation of the rotor 208. An electrical current is sent through the stator 206 to generate a magnetic field. The rotor 208 responds to the magnetic field by rotating with respect to the stator 206. Incidental currents are induced when the motor 202 is operated or run with a given range of motor torque and motor speed. These incidental currents include a circulating bearing current 230 (CBC), an electrical discharge machining bearing current (EDM BC 232), first gear current 234 and a second gear current 236. The circulating bearing current 230 (CBC) circulates through the rotor 208, the rotor shaft 210, the first set of bearings 220, the frame 204 and second set of bearings 222. The EDM BC 232 is similar to the circulating bearing current 230 and includes a discharge current between the stator 206 and the rotor 208. The first gear current 234 is discharged from the stator 206 into the frame 204, through the first set of bearings 220 and into the rotor shaft 210, where it passes from the motor 202 to the gearbox 214. The second gear current 236 is discharged from the stator 206 to the rotor 208 and then passes through the rotor shaft 210 from the motor 202 to the gearbox 214.

The rotor shaft 210 includes various chokes for suppressing the incidental currents. A first internal choke 240 is located along the rotor shaft 210 between the rotor 208 and the first bearing housing 216. A second internal choke 242 is located along the rotor shaft 210 between the rotor 208 and the second bearing housing 218. In alternative embodiments, only one of the chokes or a combination of two chokes is present. In other embodiments, the rotor shaft 210 can include more than three chokes.

The circulating bearing current 230, EDM BC 232, and the second gear current 236 pass through the first internal choke 240, while the circulating bearing current and EDM BC 232 pass through the second internal choke 242. The first internal choke 240 and second internal choke 242 reduces these currents, as discussed herein. An external choke 244 is located along the rotor shaft between the motor 202 and the gearbox 214. The first gear current 234 and the second gear current 236 pass through the external choke 244, which is used to reduce these currents.

Figure 3:
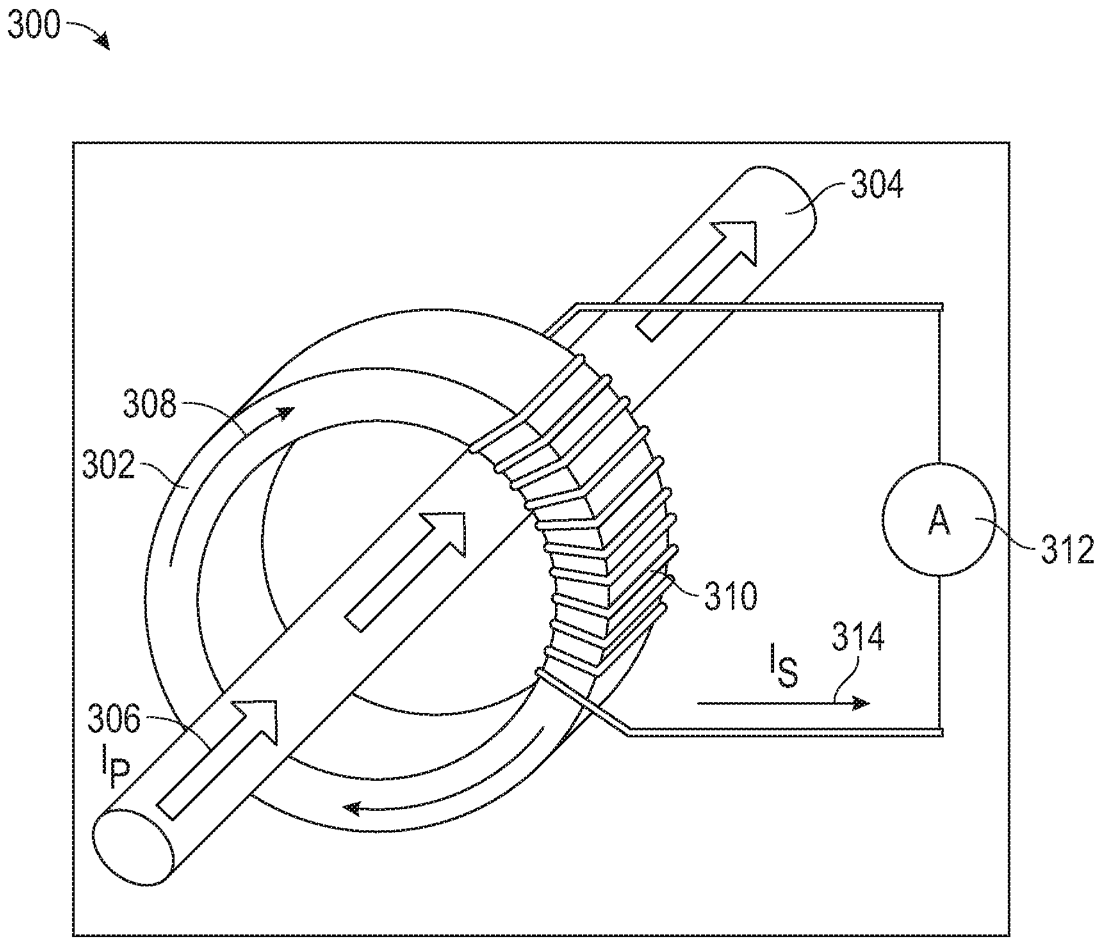
FIG. 3 shows a perspective view of a choke in an embodiment.

FIG. 3 shows a perspective view of a choke 300 in an embodiment. The choke 300 includes a magnetic material in the shape of a ring 302 that encircles a shaft 304, such as the rotor shaft 210. A primary current 306 passes along the shaft 304 through the ring 302. The primary current 306 ($I_P$) can be an alternating current which generates a magnetic field 308 in the ring 302. The magnetic field 308 creates a magnetic flux in the magnetic material of the ring 302. A change of the magnetic flux due to change in the magnetic field dissipates heat due to hysteresis losses.

A winding 310 is looped around the ring 302 to allow the choke 300 to be used as a current sensor. The winding 310 is connected by an electrical circuit to a measurement device 312. For illustrative purposes, the measurement device 312 is shown in FIG. 3 as an ammeter. The magnetic field 308 in the ring 302 induces a sensing current 314 through the winding 310 and the measurement device 312 measures the sensing current.

Referring back to FIG. 2, the first internal choke 240, the second internal choke 242 and the external choke 244 are shown with wires that allow them to be used as current sensors.

Figure 4:
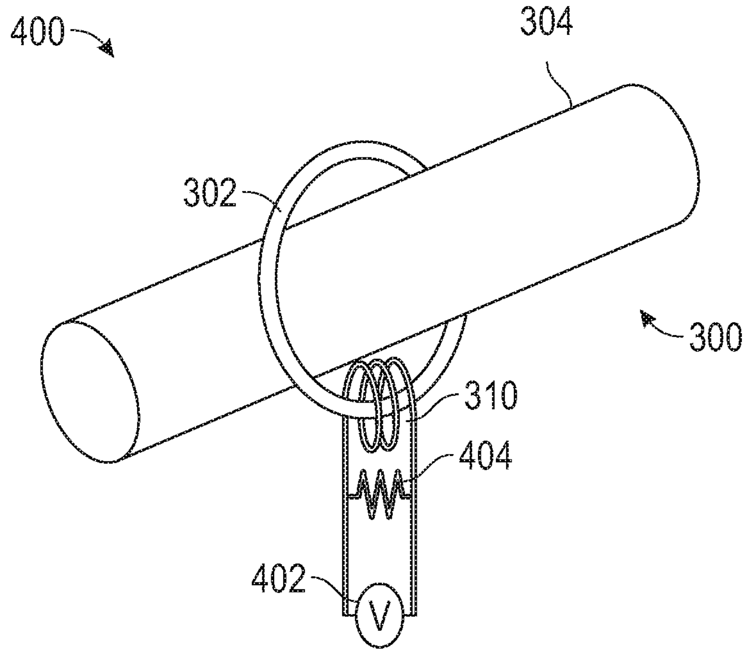
FIG. 4 shows a perspective view of the choke in a second embodiment.

FIG. 4 shows a perspective view 400 of the choke 300 in a second embodiment. The voltmeter 402 serves as the measurement device and is attached to the winding 310. A resistor 404 having a known resistance R connects across two ends of the winding 310 (i.e., a first end having current which has not entered the winding of the choke and a second end having current that has exited the winding). The voltmeter 402 measures a voltage across the resistor 404 induced by the sensing current $I_s$. The sensing current $I_s$ can then be determined by Ohm's law: $I_s=V/R$.

Figure 5:
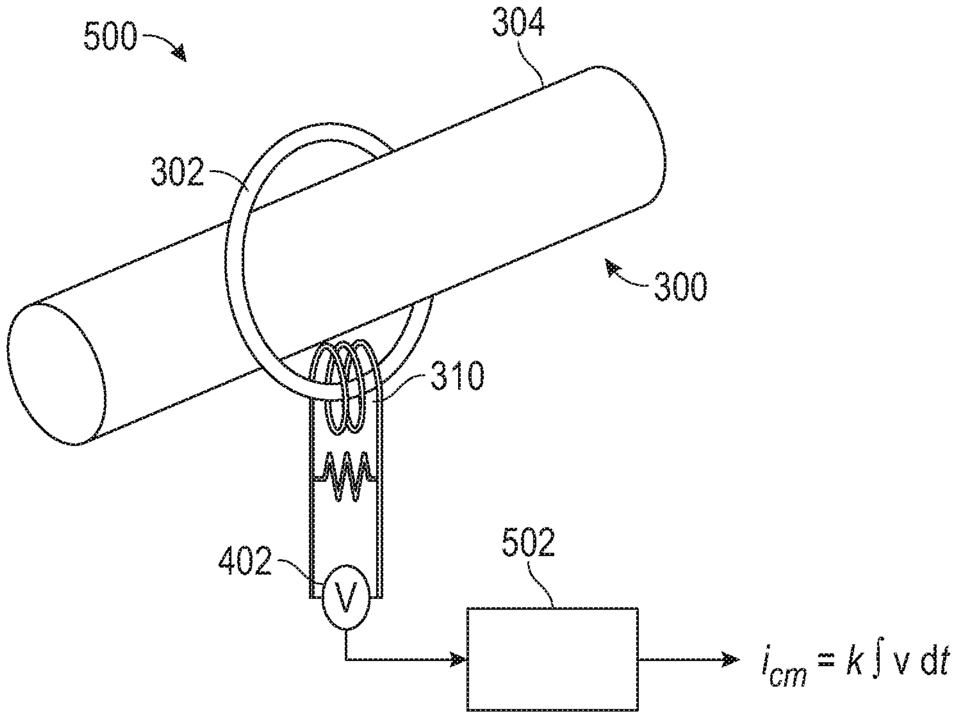
FIG. 5 shows a perspective view of the choke in a third embodiment.

FIG. 5 shows a perspective view 500 of the choke 300 in a third embodiment. The voltmeter 402 serves as the measurement device and is connected across the two ends of the winding 310. The voltage measured at the voltmeter 402 is sent to an integrator or integrating circuit 502 which integrates the voltage to determine the sensing current, as shown in Eq. (1):

$$I_s = k\int v dt \qquad \text{Eq. (1)}$$

where v is the measured voltage and k is a conversion constant.

Figure 6:
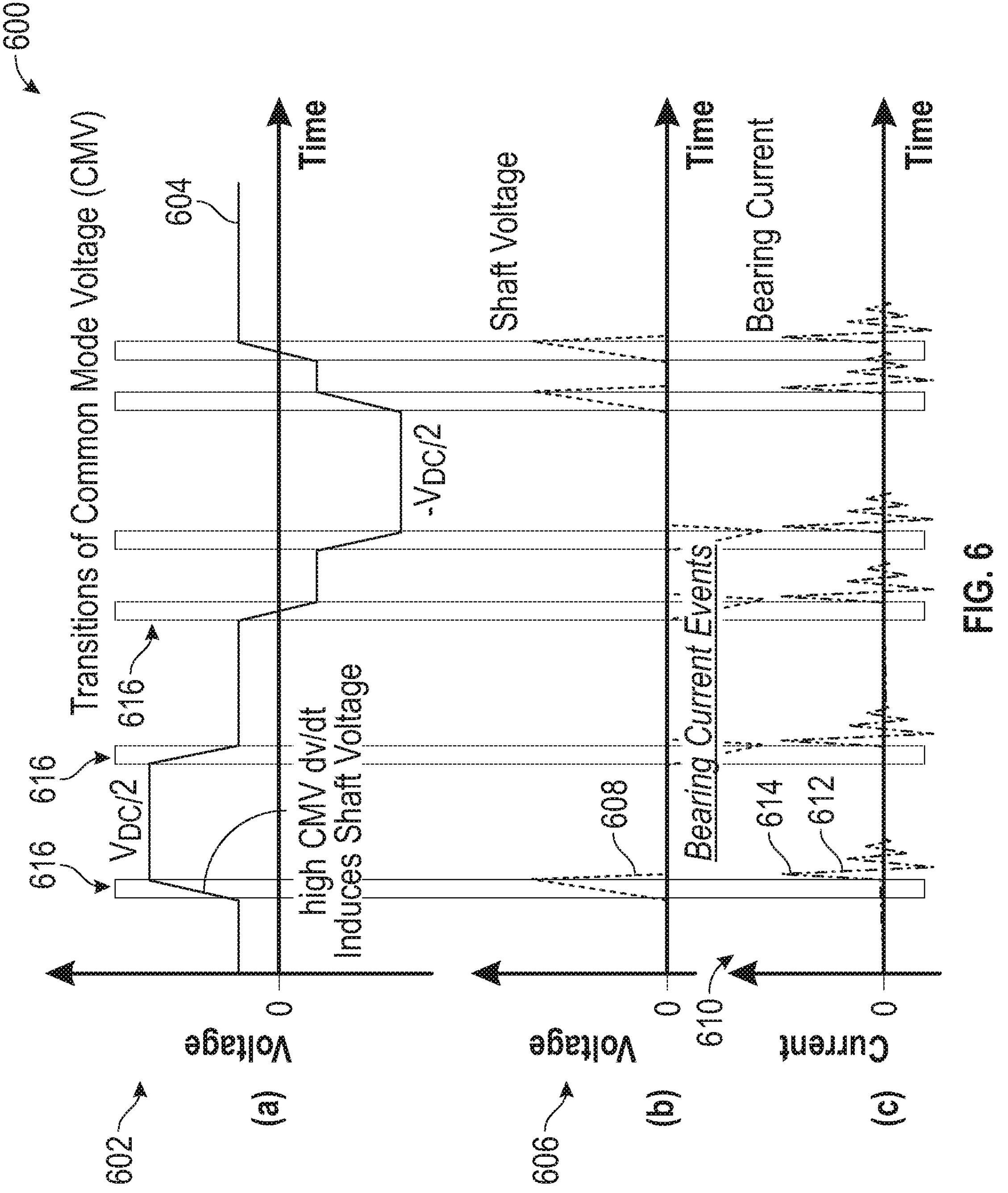
FIG. 6 shows graphs of electrical parameters of the motor over time.

FIG. 6 shows graphs 600 of electrical parameters of the motor over time. A first graph 602 shows a common mode voltage 604 supplied to the stator 206 from the inverter 228. A second graph 606 shows a shaft voltage 608 induced along the rotor shaft 210 in response to the common mode voltage 604. A third graph 610 shows a bearing current 612 passing through the bearings (e.g., first set of bearings 220) of the motor 202 in response to the shaft voltage 608. The bearing current 612 can be detected by the current sensors (e.g., the sensor of the first internal choke 240).

The common mode voltage 604 is a pulse width modulated (PWM) voltage. The common mode voltage 604 transitions from one voltage level to another voltage level during a PWM event 616. The rapid change in voltage during the time duration of a PWM event 616 induces the shaft voltage 608 shown in the second graph 606. The shaft voltage 608 in turn induces the bearing current 612 shown in the third graph 610. The bearing current 612 reaches a peak value 614 at the end of the PWM event 616, after which the bearing current dissipates with transitory fluctuations.

Figure 7:
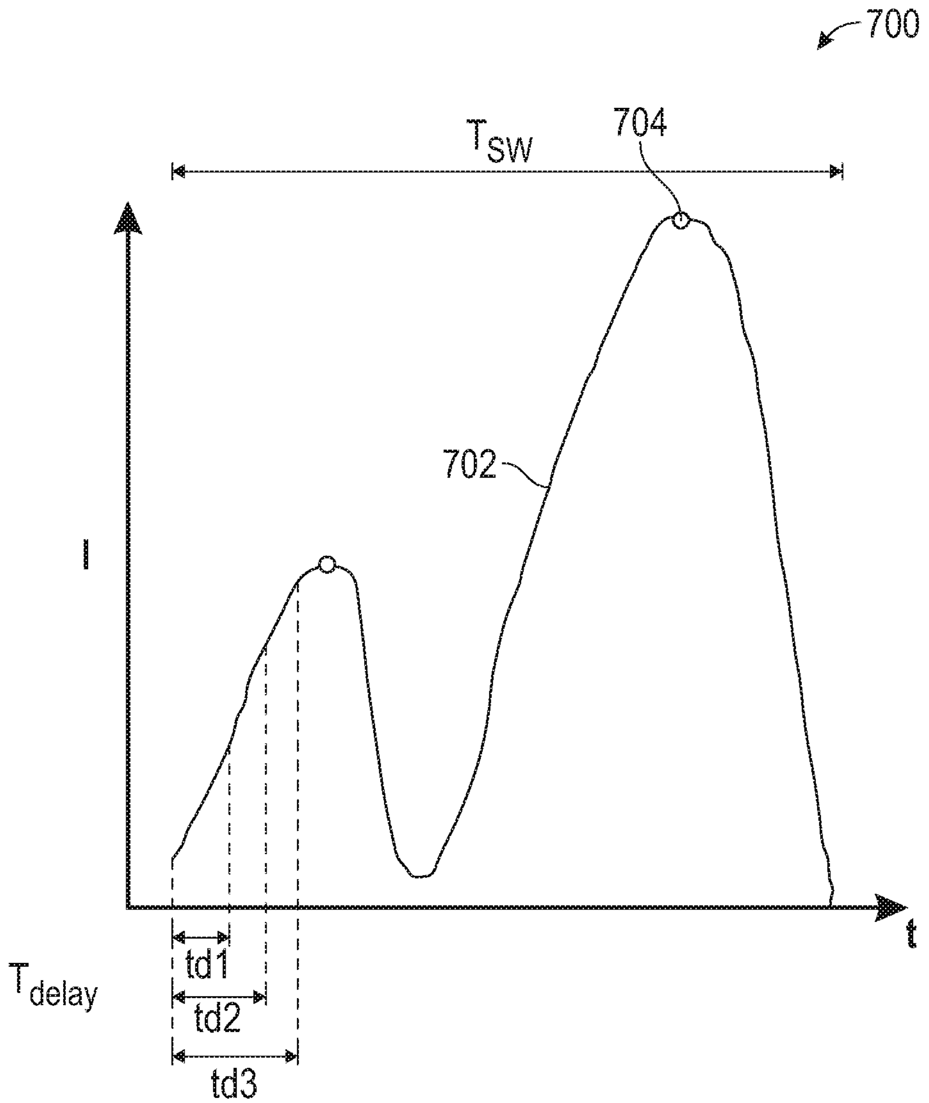
FIG. 7 shows a plot of bearing current in an illustrative embodiment.

FIG. 7 shows a plot 700 of bearing current in an illustrative embodiment. The plot includes curve 702 represents the bearing current during a switching cycle of the inverter. The curve 702 begins at the beginning of a switching period ($T_{SW}$) and ends at the end of the switching period. A method can be used to identify the global maximum 704 of the bearing current. A delay time ($T_{delay}$) is selected after the beginning of the switching period and a value of the bearing current is measured at the selected delay time. The delay time is then increased and a new bearing current is measured at the new delay time. The larger value of the bearing current is retained. This can be repeated until a global maximum 704 of the bearing current (peak bearing current) is identified.

Figure 8:
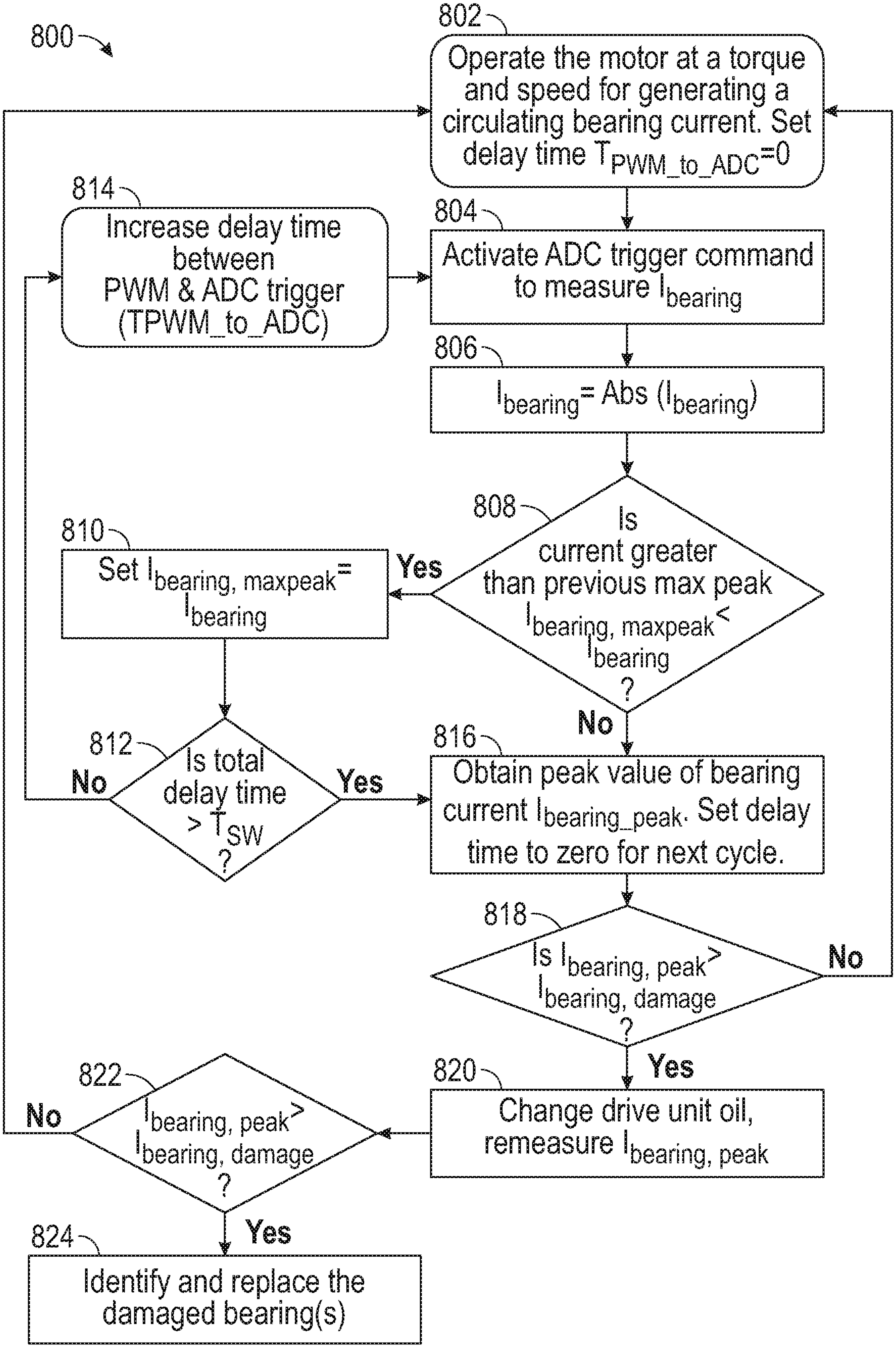
FIG. 8 shows a flowchart of a method of using current measurements to diagnose and repair or maintain the motor.

FIG. 8 shows a flowchart 800 of a method of using current measurements to diagnose and repair or maintain the motor. In box 802, the motor is operated at a torque and speed at which a circulating bearing current is present. A delay $T_{PWM\_ADC}$ between a PWM event and an ADC trigger is set to zero. In box 804, an ADC trigger is commanded (in response to a PWM event) to measure the bearing current $I_{bearing}$. In box 806, the measured bearing current $I_{bearing}$ is set to its magnitude (i.e., set $I_{bearing}$ equal to the absolute value of $I_{bearing}$).

In box 808, the bearing current $I_{bearing}$ is compared to previous maximum peak value of the bearing current ($I_{bearing,peak}$). If the bearing current is greater than previous maximum peak value, the method proceeds to box 8108.

In box 810, the maximum peak value is updated to the measured bearing current. In box 812, a total delay time is compared to the switch time Tsw. If the delay time is greater than the switch time, the method proceeds to box 816. Otherwise, the method proceeds to box 814. In box 814, the delay time $T_{PWM\_ADC}$ between the PWM event and ADC trigger is increased by a selected amount, such as a few nanoseconds. From box 814, the method returns to box 804. The loop including box 804, box 806, box, 808, box 810 and box 812 thereby adjusts the delay time $T_{PWM\_ADC}$ to a value at which the peak value of the bearing current is less than the previous maximum peak values.

Returning to box 808, if the measured bearing current is less than or equal to the maximum of the previous peak values, the method proceeds to box 816. In box 816, the peak value of the bearing current ($I_{bearing,peak}$) is obtained. In box 818, the peak value of the bearing current $I_{bearing,peak}$ is compared to a damage threshold $I_{bearing,damage}$. The damage threshold is a determined threshold indicative of damage being done to the bearings, for example, through electrical discharge. If the peak bearing current $I_{bearng,peak}$ is greater than the damage threshold $I_{bearing,damage}$, the method proceeds to box 820. Otherwise, the method returns to box 802.

In box 820, a first warning signal is transmitted to a display to warn an operator of possible damage to the bearings. The display can be a monitor or a display at a dashboard of the vehicle, for example. In particular, the first signal informs the user of the need to change the oil of the drive unit or motor. Old oil is generally more conductive than new oil and can therefore increase the magnitude of the bearing current. Changing out the old oil for new oil therefore reduces the oil conductivity and the magnitude of the bearing current. Once the oil is changed, the peak bearing current $I_{bearing,peak}$ is measured again.

In box 822, the peak bearing current $I_{bearing,peak}$ measured in box 820 is once again compared to the damage threshold. If the peak bearing current is still greater than the damage threshold, the method proceeds to box 824. Otherwise, the method returns to box 802. In box 824, a second warning signal is transmitted to the display to notify the operator who identifies and replaces the damaged bearings of the motor.

Figure 9:
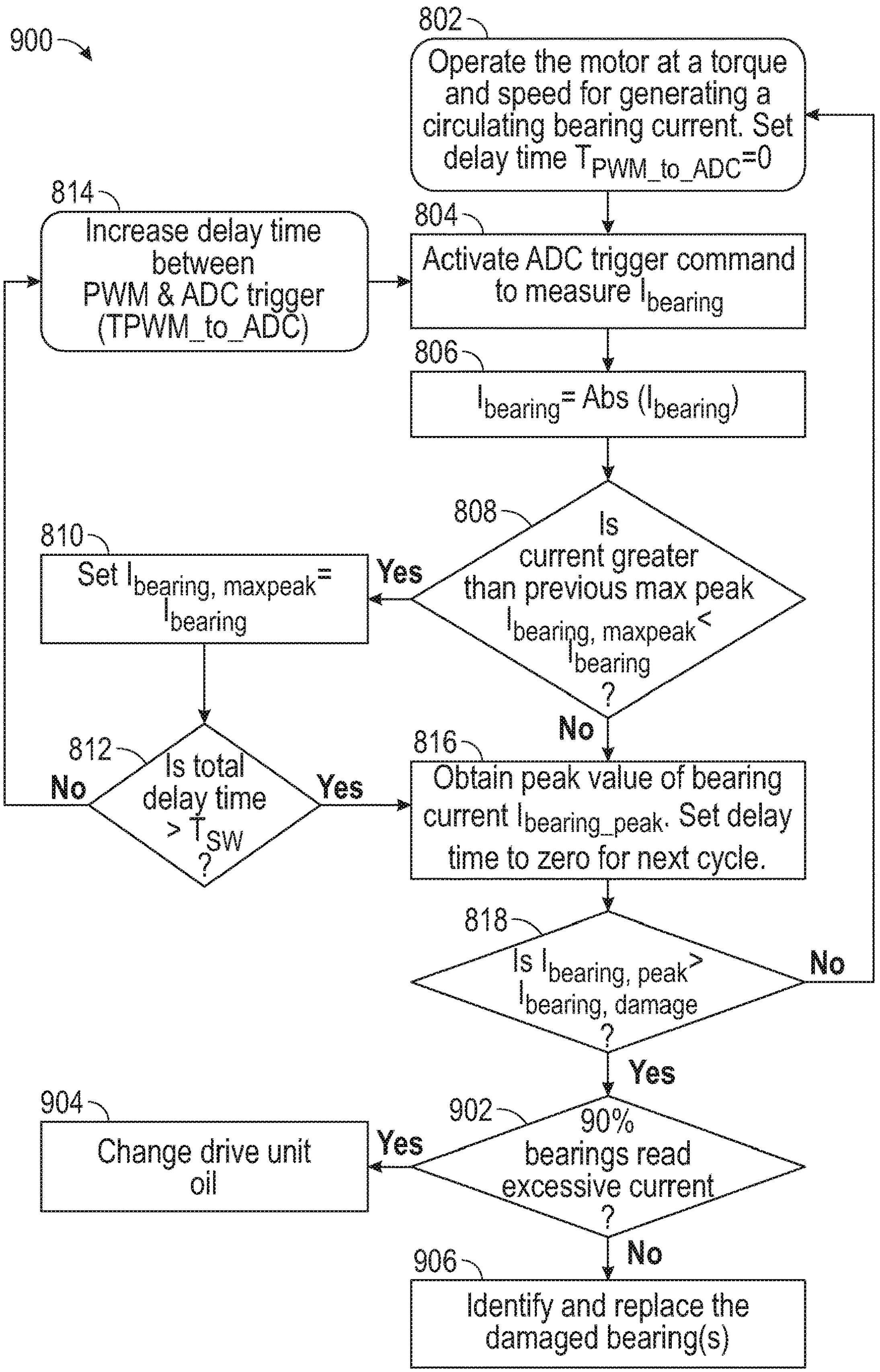
FIG. 9 shows a flowchart of a method of using sensing current measurements to diagnose and repair or maintain the motor including multiple sensors.

FIG. 9 shows a flowchart 900 of a method of using sensing current measurements to diagnose and repair or maintain the motor including multiple sensors. The flowchart 900 includes boxes 802-818 of the flowchart 800 shown in FIG. 8. From box 814, the method proceeds to box 902. In box 902, multiple current sensors are used to measure bearing currents. Each current sensor measures current through an associated bearing. If the current through a specified percentage of the bearings or through a specified number of the bearings exceeds a threshold or current limit, the method proceeds to box 904. In box 904, the oil is changed at the drive unit or motor. Returning to box 902, if the current through more than 90% of the bearings exceeds the threshold or current limit, the method proceeds to box 906. In box 906, the damaged bearings are identified and replaced.

Figure 10:
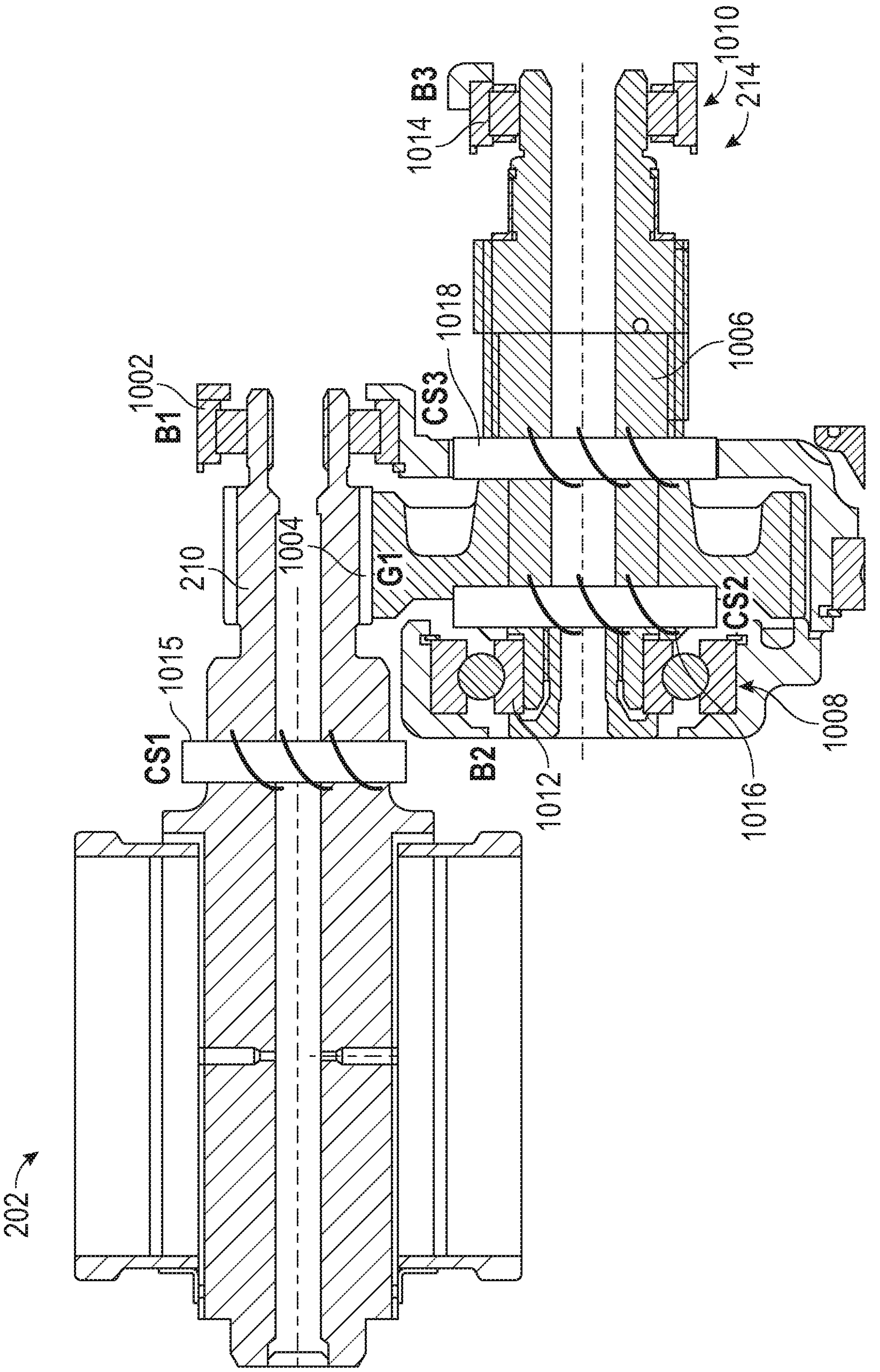
FIG. 10 shows a drive assembly including the motor and gearbox, in an illustrative embodiment.

FIG. 10 shows a drive assembly 1000 including the motor 202 and gearbox 214, in an illustrative embodiment. The motor 202 is coupled to the gearbox 214 via the rotor shaft 210. The rotor shaft 210 is attached to a frame of the gearbox 214 via a first bearing housing 1002 including bearings B1. A first gear 1004 (G1) couples the rotor shaft 210 to a transmission shaft 1006. The transmission shaft 1006 is held in place in the gearbox 214 at a first contact location 1008 at one end of the transmission shaft and a second contact location 1010 at an opposite end of the transmission shaft. A second bearing housing 1012 including bearings B2 is disposed at the first contact location 1008 to reduce friction between the transmission shaft 1006 and a frame of the gearbox 214. Similarly, a third bearing housing 1014 including bearings B3 is disposed at the second contact location 1010 to reduce friction between the transmission shaft 1006 and the frame of the gearbox 214. A first current sensor CS1 1015 is located on the rotor shaft 210 between the motor 202 and the gearbox 214. A second current sensor CS2 1016 is located on the transmission shaft 1006 between the gear G1 and the first contact location 1008. A third current sensor CS3 1018 is located on the transmission shaft 1006 between the gear G1 and the second contact location 1010.

The first current sensor CS1 1015 measures a current $I_{CS1}$ through the rotor shaft 210. The second current sensor CS2 1016 measures a current $I_{CS2}$ through the transmission shaft 1006 between the gear G1 and the first contact location 1008. The third current sensor CS3 measures a current $I_{CS3}$ through the transmission shaft 1006 between the gear G1 and the second contact location 1010. These measured currents can be used to determine currents at other locations within the gearbox 214 at which no current sensors are located. Exemplary locations include the bearings B1, bearings B2 bearings B3 and gear G1, as shown by Eqs. (2)-(5):

$$I_{B1} = I_{CS1} - (I_{CS2} - I_{CS3}) \quad \text{Eq. (2)}$$

$$I_{G1} = I_{CS2} + I_{CS3} \quad \text{Eq. (3)}$$

$$I_{B2} = I_{CS2} \quad \text{Eq. (4)}$$

$$I_{B3} = I_{CS3} \quad \text{Eq. (5)}$$

where $I_{B1}$ is the current through the bearings B1 of the gearbox, $I_{B2}$ is the current through the bearings B2, $I_{G1}$ is the current through the gear G1 and $I_{B3}$ is the current through the bearings B3.

Figure 11:
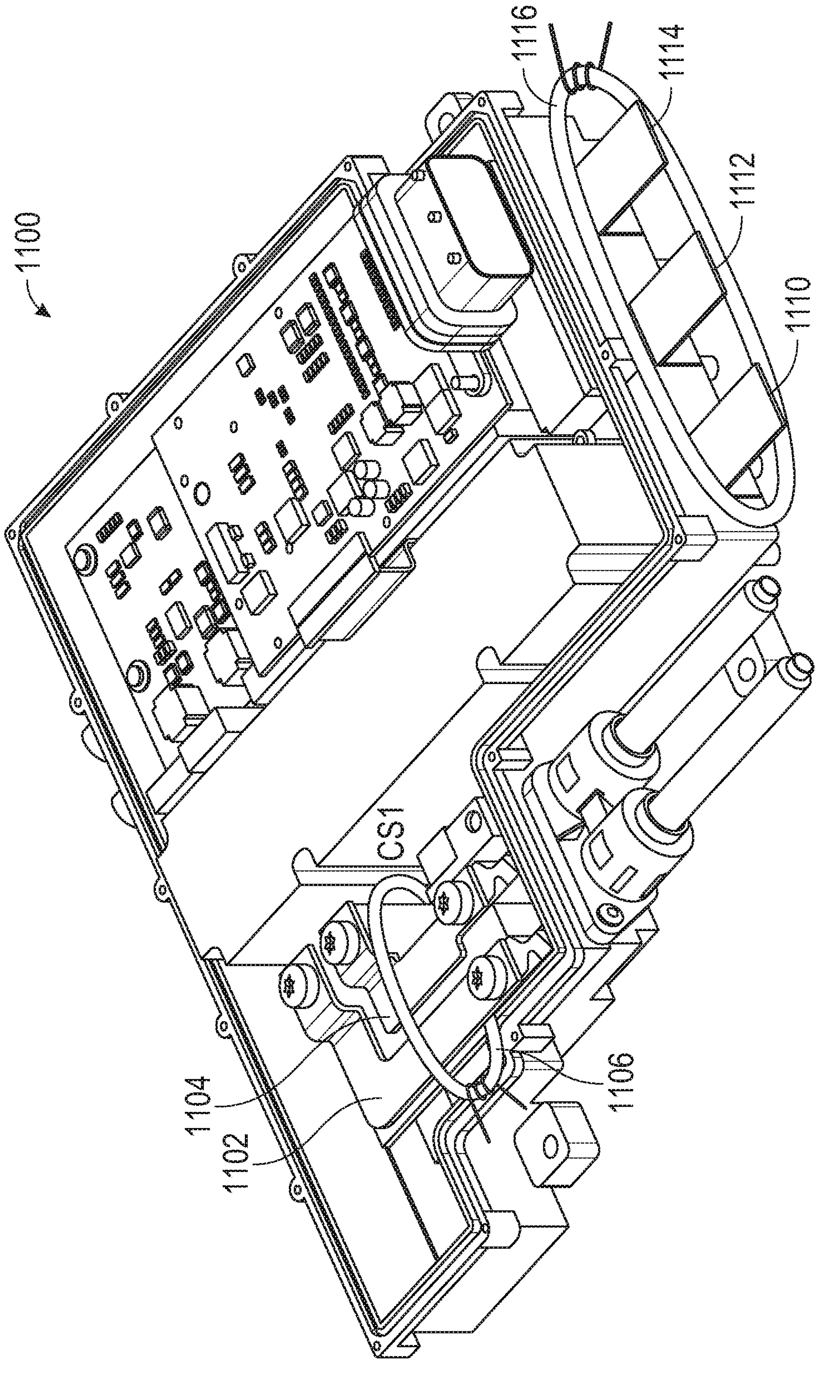
FIG. 11 shows a view of the circuitry of the inverter, in an embodiment.

FIG. 11 shows a view 1100 of the circuitry of the inverter 228, in an embodiment. The inverter 228 includes a positive DC power line 1102 and a negative DC power line 1104 for providing power to the motor. An inverter choke serves as a current sensor CS1. The positive DC power line 1102 and the negative DC power line 1104 pass through the current sensor CS1 to induce a sensing current and suppress the common mode current. The current sensor CS1 measures an inverter common mode current ("inverter current") through at least one of the positive DC power line 1102 and the negative DC power line 1104. The current sensor CS1 allows a direct measurement of a common mode current (CMC) in the motor 202.

FIG. 11 also shows AC output lines 1110, 1112, and 1114 of the inverter 228. In various embodiments, an AC current sensor 1116 can be disposed around the AC output lines 1110, 1112, and 1114 for measuring the inverter common mode current.

Figure 12:
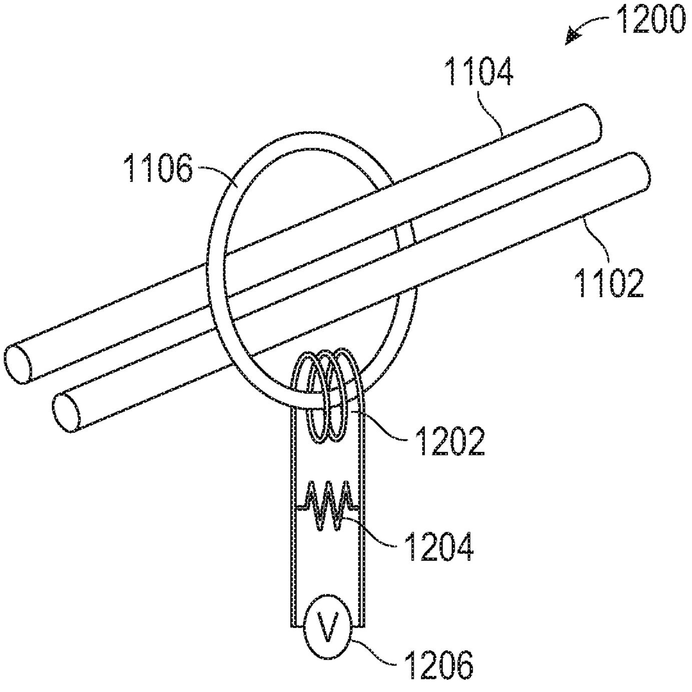
FIG. 12 shows a perspective view of the current sensor of the inverter, in an embodiment.

FIG. 12 shows a perspective view 1200 of the current sensor CS1 in an embodiment. The positive DC power line 1102 and the negative DC power line 1104 pass through the current sensor CS1. A winding 1202 is wrapped around a magnetic ring to form the current sensor CS1. A resistor 1204 having a known resistance R connects across two ends of the winding 1202. A voltmeter 1206 measures a voltage across the resistor 1204 resulting from a current $I_s$ induced in the winding 1202. The current $I_s$ can then be determined by Ohm's law: $I_s=V/R$. The current through the positive DC power line 1102 and the negative DC power line 1104 can be determined from the current $I_s$. It is to be understood that more than two power lines can pass through the current sensor CS1, in various embodiments.

Figure 13:
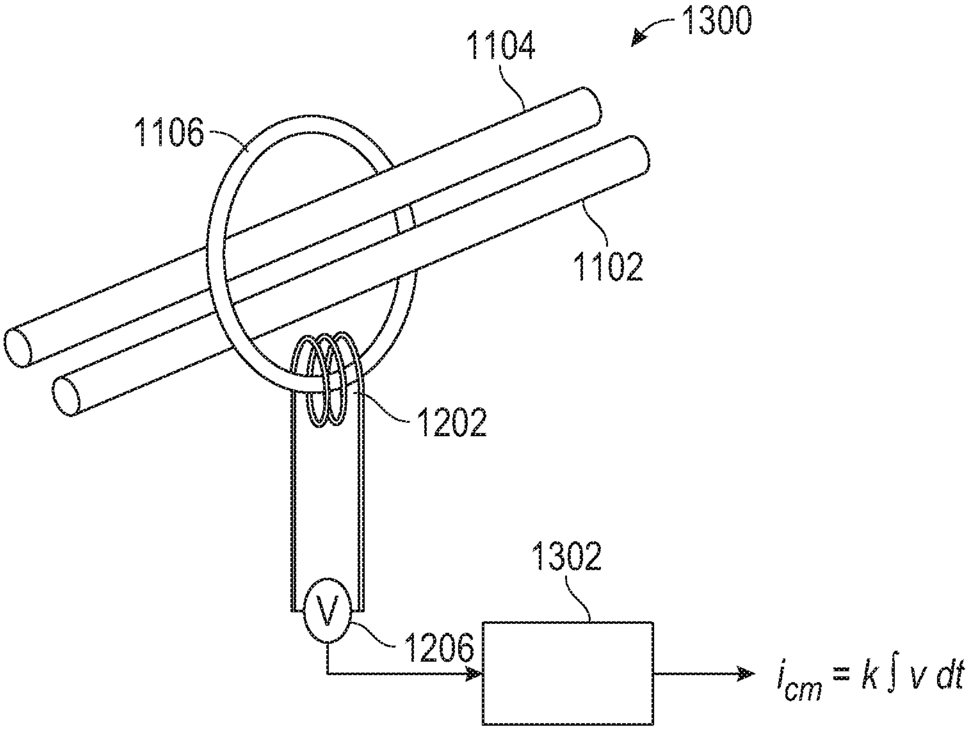
FIG. 13 shows a perspective view of the current sensor, in another embodiment.

FIG. 13 shows a perspective view 1300 of the current sensor CS1 in another embodiment. The voltmeter 1206 is connected across two ends of the winding 1202. The voltage measured at the voltmeter 1206 is sent to an integrator or integrator circuit 1302 which integrates the voltage to determine the sensing current, as discussed herein with respect to Eq. (1). Similar to FIG. 12, it is to be understood that more than two power lines can pass through the current sensor CS1, in various embodiments.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:

running a motor of the vehicle at a selected motor speed and a selected motor torque to generate a bearing current that flows through a bearing of the motor and along a rotor shaft between the motor and a gearbox of the vehicle measuring a sensing current induced through a winding at a choke in response to flow of the bearing current through the choke;

determining the bearing current from the sensing current;

transmitting a signal to notify a user when the bearing current is greater than a selected damage threshold; and performing at least one of: (i) changing an oil of a drive unit in response to the signal; and (ii) replacing the bearing in response to the signal.

2. The method of claim 1, wherein measuring the sensing current further comprises measuring the sensing current via an ammeter coupled to the winding.

3. The method of claim 1, wherein measuring the sensing current further comprises measuring a voltage across a resistor that connects ends of the winding and determining the sensing current from the voltage and a resistance of the resistor.

4. The method of claim 1, wherein measuring the sensing current further comprises measuring a voltage across ends of the winding and integrating the voltage over a time duration to determine the sensing current.

5. The method of claim 1, wherein the choke is disposed at the rotor shaft between the motor and the gearbox.

6. The method of claim 1, further comprising measuring an inverter common mode current at an inverter and determining a common mode current at the motor based on the inverter common mode current, wherein the inverter common mode current is measured via one of: (i) an inverter choke through which a positive DC power line of the inverter and a negative DC power line of the inverter passes; and (ii) an inverter choke through which at least one of an AC output line of the inverter passes.

7. The method of claim 1, wherein the choke includes a magnetic material in the shape of a ring that encircles the rotor shaft and the winding is looped about the ring, the method further comprising flowing the bearing current along the rotor shaft to induce the sensing current in the winding.

8. A system for operating a vehicle, comprising:

a motor of the vehicle, the motor including a rotor shaft and a bearing between the rotor shaft and the motor, wherein a bearing current flows through the bearing and along the rotor shaft between the motor and a gearbox of the vehicle and wherein the motor is run at a selected motor speed and selected motor torque;

a choke including a winding, wherein the bearing current passes through the choke to induce a sensing current through the winding; and a processor configured to determine the bearing current from the sensing current and transmit a signal to notify a user when the bearing current is greater than a selected damage threshold, wherein at least one of: (i) an oil of a drive unit is changed in response to the signal; and (ii) the bearing is replaced in response to the signal.

9. The system of claim 8, further comprising an ammeter coupled to the winding to measure the sensing current.

10. The system of claim 8, further comprising a resistor that connects ends of the winding and a voltmeter for measuring a voltage induced across the resistor by the sensing current, wherein the processor determines the sensing current from the voltage and a resistance of the resistor.

11. The system of claim 8, further comprising a voltmeter across ends of the winding for measuring a voltage and an integrating circuit configured to integrate the voltage over a time duration to determine the sensing current.

12. The system of claim 8, wherein the choke is disposed at the rotor shaft between the motor and the gearbox.

13. The system of claim 8, further comprising one of: (i) an inverter choke through which a positive DC power line of an inverter and a negative DC power line of the inverter passes; and (ii) an inverter choke through which at least one of an AC output line of the inverter passes, wherein the processor is configured to measure an inverter common mode current at the inverter choke and determine a common mode current at the motor based on the inverter common mode current.

14. The system of claim 8, wherein the choke includes a magnetic material in the shape of a ring that encircles the rotor shaft and the winding is looped about the ring.

15. A vehicle, comprising:

a motor including a rotor shaft and a bearing between the rotor shaft and the motor, wherein a bearing current flows through the bearing and along the rotor shaft between the motor and a gearbox of the vehicle and wherein the motor is run at a selected motor speed and selected motor torque;

a choke including a winding, wherein the bearing current passes through the choke to induce a sensing current through the winding; and a processor configured to determine the bearing current from the sensing current and transmit a signal to notify a user when the bearing current is greater than a selected damage threshold, wherein at least one of: (i) an oil of a drive unit is changed in response to the signal; and (ii) the bearing is replaced in response to the signal.

16. The vehicle of claim 15, further comprising an ammeter coupled to the winding to measure the sensing current.

17. The vehicle of claim 15, further comprising a resistor that connects ends of the winding and a voltmeter for measuring a voltage induced across the resistor by the sensing current, wherein the processor determines the sensing current from the voltage and a resistance of the resistor.

18. The vehicle of claim 15, further comprising a voltmeter across ends of the winding for measuring a voltage and an integrating circuit configured to integrate the voltage over a time duration to determine the sensing current.

19. The vehicle of claim 15, wherein the choke is disposed at the rotor shaft between the motor and the gearbox.

20. The vehicle of claim 15, further comprising one of: (i) an inverter choke through which a positive DC power line of an inverter and a negative DC power line of the inverter passes; and (ii) an inverter choke through which at least one of an AC output line of the inverter passes, wherein the processor is configured to measure an inverter common mode current at the inverter choke and determines a common mode current at the motor based on the inverter common mode current.

* * * * *